(12) United States Patent
Georgin

(10) Patent No.: US 10,246,063 B2
(45) Date of Patent: Apr. 2, 2019

(54) WHEEL REFERENCE BALANCE ESTIMATOR

(71) Applicant: Goodrich Corporation, Charlotte, NC (US)

(72) Inventor: Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 298 days.

(21) Appl. No.: 15/210,519

(22) Filed: Jul. 14, 2016

(65) Prior Publication Data
US 2018/0015910 A1 Jan. 18, 2018

(51) Int. Cl.
| | |
|---|---|
| B60T 8/17 | (2006.01) |
| B60T 8/171 | (2006.01) |
| B60T 8/1761 | (2006.01) |
| B60T 8/172 | (2006.01) |

(52) U.S. Cl.
CPC ............ B60T 8/1703 (2013.01); B60T 8/171 (2013.01); B60T 8/172 (2013.01); B60T 8/17616 (2013.01); *B60T 2250/04* (2013.01)

(58) Field of Classification Search
None
See application file for complete search history.

(56) References Cited

U.S. PATENT DOCUMENTS

| | | | | |
|---|---|---|---|---|
| 3,622,208 A | * | 11/1971 | Krugler, Jr. ......... | B60T 8/17613 188/181 C |
| 3,926,479 A | * | 12/1975 | Bissell .................. | B60T 8/1703 244/111 |
| 4,076,331 A | * | 2/1978 | DeVlieg ................. | B60T 13/12 244/111 |
| RE30,209 E | * | 2/1980 | McNinch, Jr. ...... | B60T 8/17613 303/149 |
| 4,989,923 A | | 2/1991 | Lee | |
| 5,011,236 A | * | 4/1991 | Toepfer ................... | B60T 8/00 303/128 |

(Continued)

FOREIGN PATENT DOCUMENTS

| | | |
|---|---|---|
| EP | 2821301 A1 | 1/2015 |
| GB | 2314130 A | 12/1997 |
| WO | WO0192077 A1 | 12/2001 |

OTHER PUBLICATIONS

Extended European Search Report dated Nov. 30, 2017 in Application No. 17179913.3.

*Primary Examiner* — Shelley Chen
(74) *Attorney, Agent, or Firm* — Snell & Wilmer, L.L.P.

(57) ABSTRACT

Systems and methods are disclosed herein for controlling braking systems. In this regard, a method for controlling brakes may comprise receiving, by an antiskid control (ASK), a first wheel speed, calculating, by the ASK, a first wheel reference speed (WRS), and calculating, by the ASK, a first wheel reference estimate (WRE). In various embodiments, the method may further comprise determining if the first WRS is within a threshold value of the first WRE. In various embodiments, the method may further comprise calculating an ASK desired pressure. The ASK desired pressure may be calculated using the first WRS in response to the first WRS being within the threshold value of the first WRE. The ASK desired pressure may be calculated using the first WRE in response to the first WRS being outside the threshold value of the first WRE.

20 Claims, 7 Drawing Sheets

(56) References Cited

U.S. PATENT DOCUMENTS

| | | | | |
|---|---|---|---|---|
| 5,046,787 | A * | 9/1991 | Kuwana | B60T 8/172 180/197 |
| 5,479,811 | A * | 1/1996 | Baumann | B60K 28/16 73/1.37 |
| 5,642,280 | A | 6/1997 | Negrin | |
| 5,682,333 | A * | 10/1997 | Baumann | B60T 8/172 180/197 |
| 5,727,856 | A * | 3/1998 | Kost | B60T 8/175 180/197 |
| 5,863,105 | A * | 1/1999 | Sano | B60T 8/17552 303/140 |
| 6,062,660 | A * | 5/2000 | Matsuno | B60T 8/1706 188/181 C |
| 6,169,951 | B1 * | 1/2001 | Ghoneim | B60T 8/172 303/140 |
| 6,182,003 | B1 * | 1/2001 | Maier-Landgrebe | B60K 28/16 180/197 |
| 6,338,392 | B1 * | 1/2002 | Schmitt | B60K 28/16 180/197 |
| 6,584,398 | B1 * | 6/2003 | Erban | B60K 17/3462 180/197 |
| 6,945,611 | B2 * | 9/2005 | Mayer | B60T 8/172 303/122.06 |
| 8,473,174 | B2 * | 6/2013 | Kroeger | B60T 8/172 303/146 |
| 8,965,657 | B2 | 2/2015 | Georgin | |
| 2002/0041167 | A1 * | 4/2002 | Kitano | B60K 6/48 318/3 |
| 2004/0041465 | A1 * | 3/2004 | Mayer | B60T 8/172 303/20 |
| 2007/0112477 | A1 * | 5/2007 | Van Zanten | B60T 8/1725 701/2 |
| 2012/0173133 | A1 * | 7/2012 | Ranc | B60T 8/172 701/124 |
| 2012/0179348 | A1 * | 7/2012 | Kroeger | B60T 8/172 701/80 |
| 2015/0012201 | A1 | 1/2015 | Metzger | |
| 2015/0239445 | A1 * | 8/2015 | Inoue | B60T 8/86 701/70 |
| 2016/0121870 | A1 * | 5/2016 | Bennett | B60T 17/221 701/71 |

* cited by examiner

WHEEL REFERENCE BALANCE ESTIMATOR

FIELD

The present disclosure relates generally to the field of brake control systems, and more specifically to systems and methods for aircraft brake control.

BACKGROUND

Aircraft brake control systems typically employ a brake control unit (BCU). The BCU may receive brake commands from an antiskid control (ASK) as well as brake commands from a pilot. The BCU generally produces a pressure command which may be the minimum of the pilot desired pressure and the antiskid desired pressure. This pressure command is generally sent to a pressure control for controlling pressure being supplied to a brake of an aircraft wheel for braking.

Typically, the ASK will calculate a wheel reference speed. The wheel reference speed is used to calculate the antiskid desired pressure.

SUMMARY

Systems and methods disclosed herein may be useful for providing braking to aircraft brakes. In this regard, a method for controlling brakes may comprise receiving, by an antiskid controller (ASK), a first wheel speed, calculating, by the ASK, a first wheel reference speed (WRS), calculating, by the ASK, a first wheel reference estimate (WRE), and determining, by the ASK, if the first WRS is within a threshold value of the first WRE.

In various embodiments, the method may further comprise calculating, by the ASK, an ASK desired pressure, wherein, in response to the first WRS being within the threshold value of the first WRE, the ASK desired pressure is calculated using the first WRS. The method may further comprise calculating, by the ASK, an ASK desired pressure, wherein, in response to the first WRS being outside the threshold value of the first WRE, the ASK desired pressure is calculated using the first WRE. The method may further comprise receiving, by the ASK, a second wheel speed, and calculating, by the ASK, a second WRS, wherein the first WRE is calculated using the first WRS and the second WRS. The method may further comprise receiving, by the ASK, a third wheel speed, receiving, by the ASK, a fourth wheel speed, calculating, by the ASK, a third WRS, calculating, by the ASK, a fourth WRS, and calculating, by the ASK, a second WRE. The second WRE may be calculated using the third WRS and the fourth WRS. The first WRS and the second WRS may correspond to a first set of wheels being located on a first landing gear and the third WRS and the fourth WRS may correspond to a second set of wheels being located on a second landing gear. The second WRE may be calculated by calculating the arithmetic mean of at least the third WRS and the fourth WRS. The method may further comprise determining, by the ASK, if the third WRS is within a threshold value of the second WRE. The method may further comprise determining, by the ASK, if the fourth WRS is within a threshold value of the second WRE.

A brake control system may comprise an antiskid control (ASK) configured to receive a first wheel speed value to calculate a first wheel reference speed (WRS) and a second wheel speed value to calculate a second WRS, calculate a wheel reference estimate (WRE) using the first WRS and the second WRS, and determine if at least one of the first WRS and the second WRS is within a threshold value of the WRE.

In various embodiments, in response to the first WRS being within the threshold value of the WRE, the ASK may use the first WRS to calculate a desired pressure. In response to the first WRS being outside the threshold value of the WRE, the ASK may use the WRE to calculate a desired pressure. The WRE may comprise an average value of at least the first WRS and the second WRS. The threshold value may comprise between 80% and 120%. The first WRS may be related to the first wheel speed value by a wheel slip value.

A brake control system may comprise a processor and a tangible, non-transitory memory configured to communicate with the processor. The tangible, non-transitory memory may have instructions stored thereon that, in response to execution by the processor, cause an antiskid control (ASK) to perform operations comprising receiving a first wheel speed, calculating a first wheel reference speed (WRS), calculating a first wheel reference estimate (WRE), and determining if the first WRS is within a threshold value of the first WRE.

In various embodiments, the operations may further comprise calculating an ASK desired pressure, wherein, in response to the first WRS being within the threshold value of the first WRE, the ASK desired pressure is calculated using the first WRS. The operations may further comprise calculating an ASK desired pressure, wherein, in response to the first WRS being outside the threshold value of the first WRE, the ASK desired pressure is calculated using the first WRE. The operations may further comprise receiving a second wheel speed, and calculating a second WRS, wherein the first WRE is calculated using the first WRS and the second WRS. The operations may further comprise receiving a third wheel speed, receiving a fourth wheel speed, calculating a third WRS, calculating a fourth WRS, and calculating a second WRE, wherein the second WRE is calculated using the third WRS and the fourth WRS, the first WRS and the second WRS corresponding to a first set of wheels being located on a first landing gear and the third WRS and the fourth WRS corresponding to a second set of wheels being located on a second landing gear. The second WRE may be calculated by calculating the arithmetic mean of at least the third WRS and the fourth WRS. The operations may further comprise determining if the third WRS is within a threshold value of the second WRE. The operations may further comprise determining if the fourth WRS is within a threshold value of the second WRE.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

Figure 1:
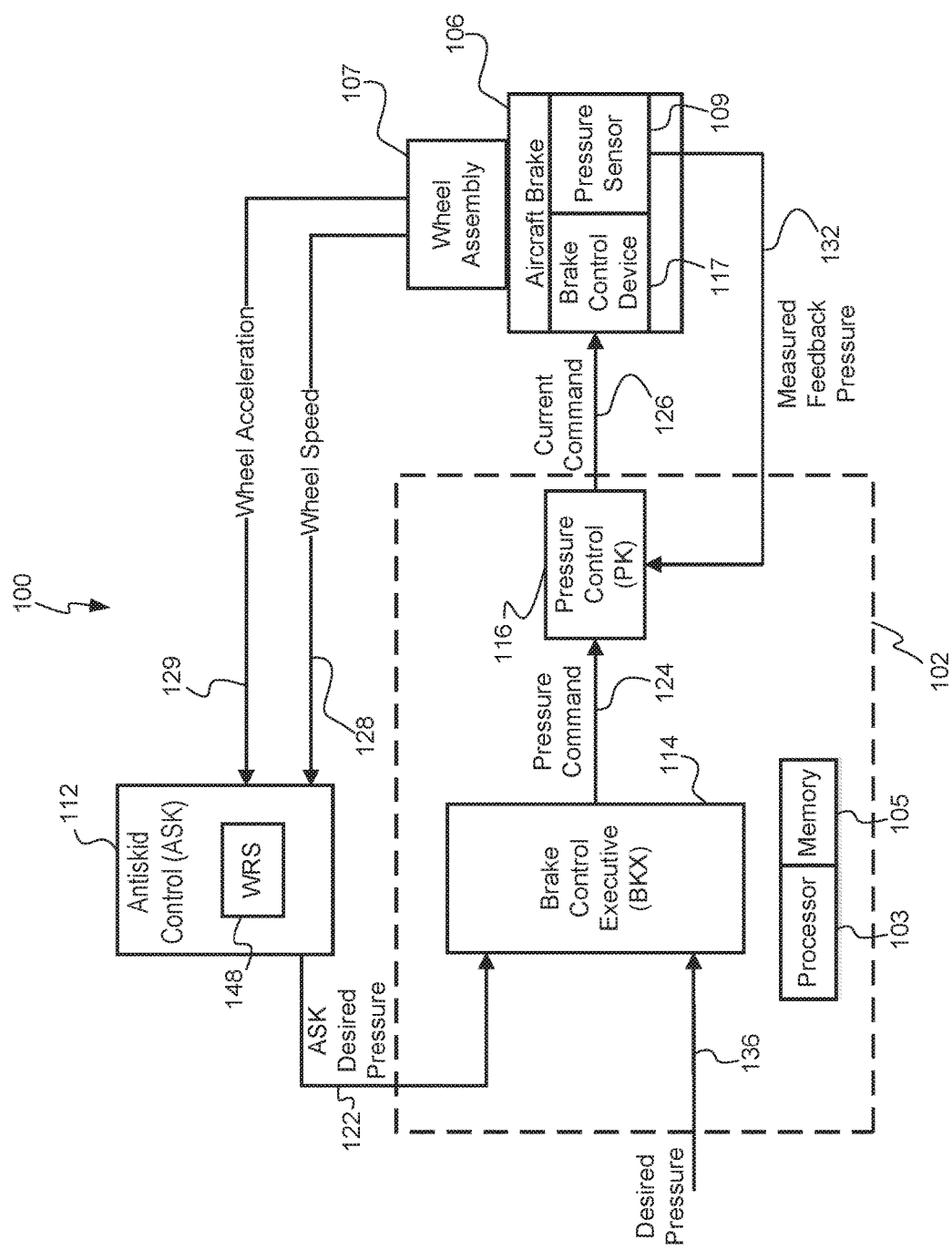
FIG. 1 illustrates a schematic view of a system for aircraft braking, in accordance with various embodiments.

With reference to FIG. 1, a system 100 for aircraft braking control is illustrated, in accordance with various embodiments. System 100 may provide aircraft braking control by controlling brake 106. The system 100 may include a brake control unit (BCU) 102, the brake 106, and a wheel assembly 107. In various embodiments, BCU 102 may comprise antiskid control (ASK) 112, brake control executive (BKX) 114, and pressure control (PK) 116.

In various embodiments, brake 106 may apply stopping force in response to pressure applied by brake control device 117. Brake control device 117 may be an electronically controlled servo configured to actuate a hydraulic valve and thereby control the stopping force generated by brake 106. Brake control device 117 may receive an instruction to apply pressure to one or more friction disks of the brake 106. In response, the brake control device 117 may open and/or close a hydraulic valve to varying degrees to adjust the pressure applied by brake 106, thus decelerating the wheel assembly 107 in a controlled manner. This pressure may be referred to as a braking pressure.

In various embodiments, brake control device 117 may also be an electromechanical brake actuator configured to actuate a puck against the brake stack in response to a current and/or voltage applied to the actuator. The force of the puck compressing the brake stack provides braking torque, to stop wheel assembly 107.

In various embodiments, the BCU 102 may include one or more processors 103 and one or more tangible, non-transitory memories 105 in communication with processor 103. Processors 103 are capable of implementing logic. The processor 103 can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, BCU 102 may receive a desired pressure value 136. In various embodiments, desired pressure value 136 may be received from a pilot control, for example, located in the cockpit of an aircraft. Desired pressure value 136 may be received from an automated system, such as an auto-brake system, in accordance with various embodiments. Desired pressure value 136 may be received from a manual system, such as a pedal or handle, in accordance with various embodiments. In this regard, brake 106 may be controlled according to desired pressure value 136.

In various embodiments, brake 106 may also be controlled by an antiskid control unit 112 (ASK) that is part of a brake control algorithm unit. The brake control algorithm unit may include the ASK 112, the BKX, and the PK 116. The brake control algorithm is illustrated as a component of BCU 102, but may also be implemented outside BCU 102 and operate in concert with BCU 102. In that regard, the BCU may include one or more of the ASK 112, BKX 114, and/or PK 116. Each of the components may also be implemented outside BCU 102.

In various embodiments, ASK 112 may receive a wheel speed value 128 from the wheel assembly 107, and a wheel acceleration value 129 from the wheel assembly 107. In various embodiments, the wheel speed value 128 may comprise a filtered value. In various embodiments, the wheel acceleration value 129 may comprise a filtered value. The ASK 112 may output an antiskid control desired pressure value (ASK desired pressure value) 122 corresponding to a desired amount of pressure to be applied to the brake 106 based on the wheel speed value 128 and the wheel acceleration value 129. The desired pressure command value may be based on an algorithm for reducing the likelihood of the aircraft skidding. In this regard. ASK 112 may be in electronic communication with BCU 102.

The BKX 114 may receive both the desired pressure value 136 and the ASK desired pressure value 122 and issue a pressure command value 124 based on the desired pressure value 136 and the ASK desired pressure value 122. In various embodiments, the pressure command value 124 may be equal to the minimum value of the ASK desired pressure value 122 and the desired pressure value 136. The pressure command value 124 may correspond to a desired amount of pressure to be applied to the brake 106.

The PK 116 may receive the pressure command value 124 and may convert the pressure command value 124 into a current command value 126. Current command value 126 may be a current measured in Amperes such as, for example, a current, in various embodiments, from the range of 2 mA-30 mA, and in various embodiments, from the range of 5 mA-25 mA, and in various embodiments, from the range of 10 mA-20 mA. The current command value 126 may be received by the brake control device 117 of the brake 106. Brake control device 117 may be designed to convert the current command value 126 into a pressure command. The pressure command may be applied to one or more disks of a disk brake system of the brake 106. The relationship between received current of brake control device 117 and the amount of pressure applied may generally be linear. For example, in various embodiments the relationship may be described as $$\text{current} = \frac{\text{pressure}}{151.2 \text{ psi/ma}} + 5.5 \text{ ma.}$$

In various embodiments, PK 116 may use the predetermined relationship between current and pressure to determine the current command value 126 based on the known pressure command value 124.

In various embodiments, PK 116 may also use another predetermined relationship for determining the current command value 126 based on the pressure command value 124. The PK 116 may also determine the current command value 126 based on a measured pressure value 132 corresponding to a measured pressure applied to the one or more disks of the brake 106. In that regard, the determination of the current command value 126 may be based on a feedback system such that the current command value 126 is adjusted in an attempt to equalize the measured pressure value 132 and the pressure command value 124 based on the aforementioned relationship.

In various embodiments, brake 106 may include a pressure sensor 109 for measuring the pressure applied by the brake control device 117. The pressure sensor 109 may transmit the measured pressure value 132 to PK 116 for feedback control of brake control device 117. In embodiments using an electromechanical actuator for brake control device 117, pressure sensor 109 may comprise a force sensor in the form of a load cell output. In various embodiments, however, pressure sensor 109 may comprise a force estimation based upon current drawn by the brake control device 117.

As previously mentioned, ASK 112 may use wheel acceleration value 129 and wheel speed value 128 to calculate ASK desired pressure value 122. ASK 112 may use at least wheel speed value 128 to calculate a wheel reference speed (WRS) 148. Wheel reference speed 148 may comprise a value corresponding to the speed of wheel assembly 107 as if wheel assembly were free rolling (i.e., no braking being applied). In this regard, the difference between WRS 148 and wheel speed value 128 may be proportional to the difference between the linear speed of the aircraft and the speed of the wheels of the aircraft, also referred to as wheel slip.

Occasionally, various parameters, such as the tuning of the brake control algorithm unit for example, may result in a wheel reference speed being erroneously calculated. An erroneously calculated wheel reference speed may result in an erroneously calculated antiskid desired pressure value and thus the brakes may receive an incorrect braking pressure, usually being less than desired. In this regard, a "pressure droop" may occur in the braking pressure being applied to the brakes. Stated another way, the brakes may receive a less than desired braking pressure. Similarly, as a result, a pressure command may be less than desired.

Figure 2A:
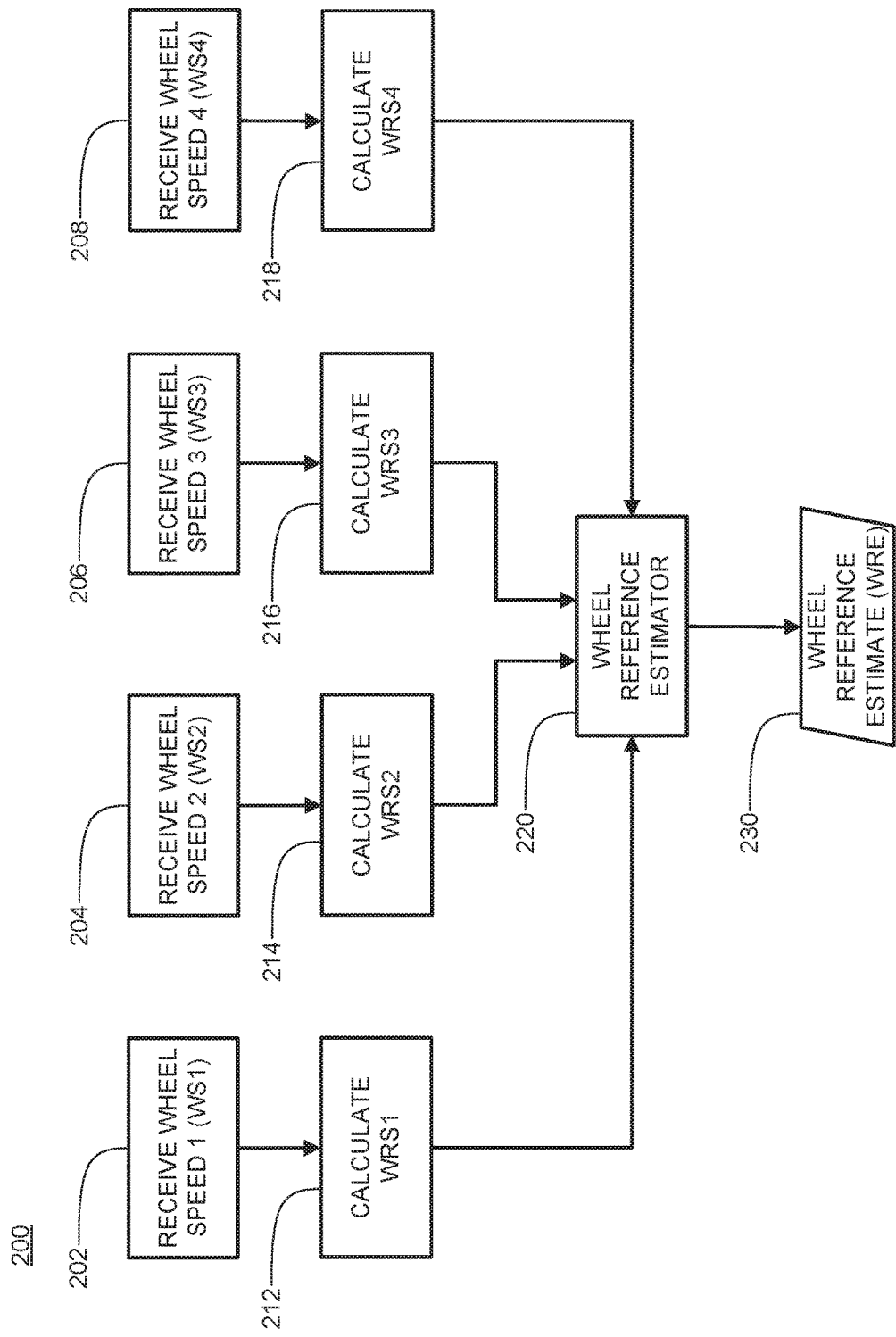
FIG. 2A illustrates a flow diagram for calculating a wheel reference estimate using the system of FIG. 1, in accordance with various embodiments.

With reference to FIG. 2A, a flow diagram 200 is shown for calculating a wheel reference estimate 230 using system 100 (see FIG. 1), in accordance with various embodiments. With combined reference to FIG. 1 and FIG. 2A, ASK 112 may receive a first wheel speed WS1 (Block 202). First wheel speed WS1 may be measured using wheel speed transducers in wheel assembly 107 to transmit wheel speed value 128 and/or wheel acceleration value 129 measurements to BCU 102. ASK 112 may similarly receive a plurality of other wheel speeds. For example, ASK 112 may receive second wheel speed WS2 (Block 204), third wheel speed WS3 (Block 206), and fourth wheel speed WS4 (Block 208).

ASK 112 may use the wheel speeds (i.e., WS1, WS2, WS3, and/or WS4) to calculate a plurality of wheel reference speeds. For example, ASK 112 may use WS1, WS2, WS3, and WS4 to calculate WRS1 (block 212). WRS2, (block 214), WRS3 (block 216), and WRS4 (block 218), respectively. WRS1, WRS2, WRS3, and WRS4 may be similar to WRS 148. Wheel reference estimator 220 may receive the wheel reference speeds (i.e., WRS1, WRS2, WRS3, and WRS4). Wheel reference estimator 220 may comprise instructions stored in memory 105.

In this regard, ASK 112 may be configured to receive a first wheel speed value (i.e., WS1) to calculate a first wheel reference speed (i.e., WRS1) and may be configured to receive a second wheel speed value (i.e., WS2) to calculate a second WRS (i.e., WRS2). Furthermore, ASK 112 may be configured to calculate a wheel reference estimate (WRE) (i.e., WRE 230) using the first WRS and the second WRS.

In various embodiments, wheel reference estimator 220 may calculate wheel reference estimate 230. Wheel reference estimator 220 may calculate WRE 230 as the average of the wheel speed references. In various embodiments, wheel reference estimator 220 may calculate WRE 230 as the arithmetic mean WRE=((WRS1+WRS2+WRS3+WRS4))/4. In various embodiments, WRE 230 may be calculated as the root mean square, medium, or mode of the wheel speed references.

Figure 2B:
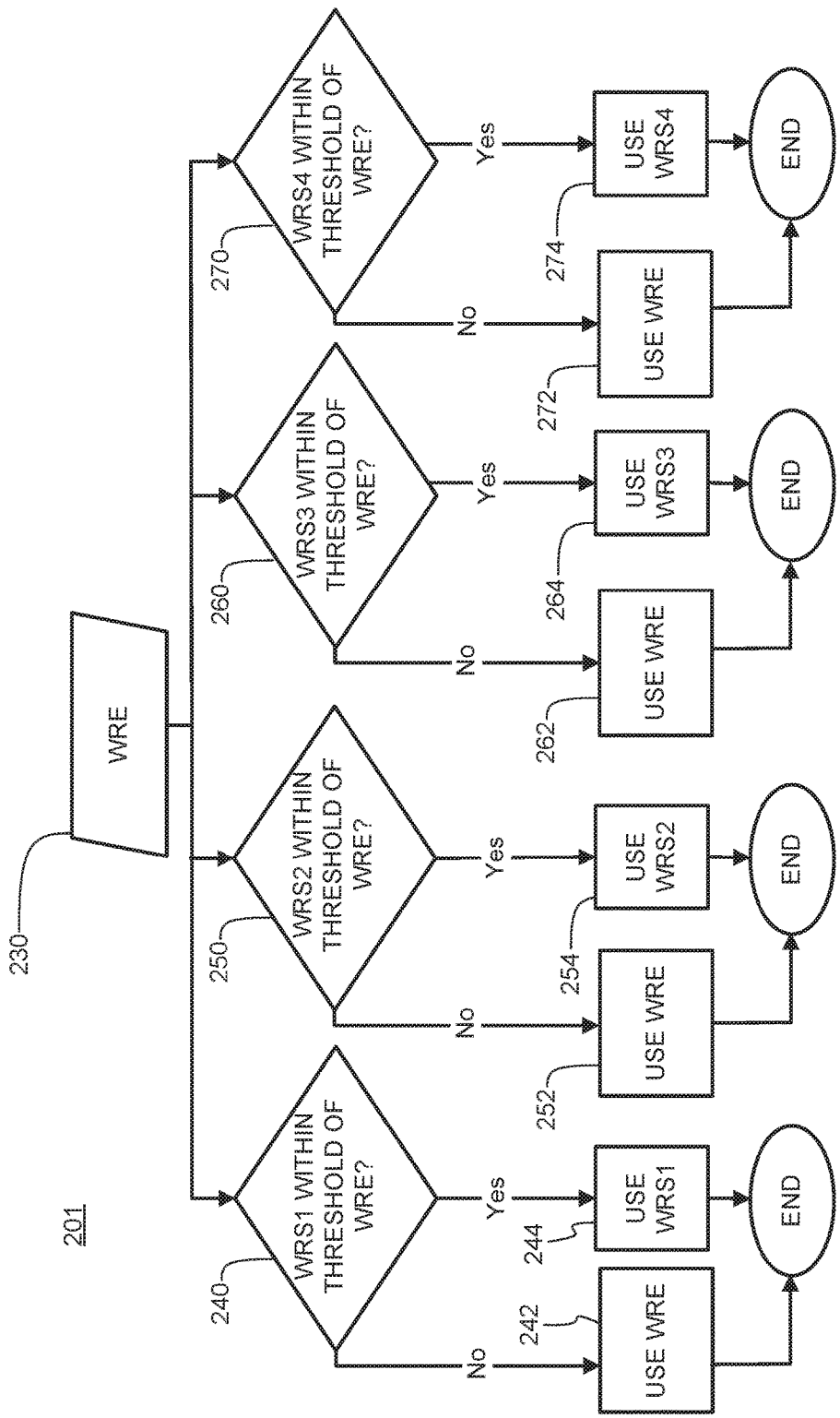
FIG. 2B illustrates a flow diagram for detecting a faulty wheel reference speed using the system of FIG. 1, in accordance with various embodiments.

With reference to FIG. 2B, a continuation of the flow diagram 200 of FIG. 2A is illustrated as flow diagram 201 for detecting a fault) wheel reference speed 148 using system 100 (see FIG. 1), in accordance with various embodiments. With combined reference to FIG. 1 and FIG. 2B, ASK 112 may determine if WRS1 is within a threshold value of WRE 230 (Block 240). Similarly, ASK 112 may determine if WRS2 (Block 250), WRS3 (Block 260), and WRS4 (Block 270) are within the threshold value of WRE 230. In various embodiments, the threshold value may comprise a range of between 50%-100%. In various embodiments, the threshold value may comprise a range of between 80%-120%. In various embodiments, the threshold value may comprise a range of between 95%-105%. If WRS1 is within the threshold value, then ASK 112 may use WRS1 to calculate ASK desired pressure value 122 (Block 244). In this regard, if WRS1 comprises a value of 98 and WRE 230 comprises a value of 100, then ASK 112 will use WRS1 to calculate ASK desired pressure value 122. If WRS1 is outside the threshold value, then ASK 112 may use WRE 230 to calculate ASK desired pressure value 122 (Block 242). In this regard, if WRS1 comprises a value of 180 and WRE 230 comprises a value of 100, then ASK 112 will use WRE 230 to calculate ASK desired pressure value 122. In this regard, ASK 112 may calculate ASK desired pressure value 122 using WRS1 in response to WRS1 being within the threshold value of WRE 230. Conversely, ASK 112 may calculate ASK desired pressure value 122 using WRE 230 in response to WRS1 being outside the threshold value of WRE 230. Block 252, block 262, and block 272 may be similar to block 242. Block 254, block 264, and block 274 may be similar to block 244. In various embodiments, the threshold value may be determined based on the weight, speeds, wheel size, etc. of an aircraft.

Figure 3:
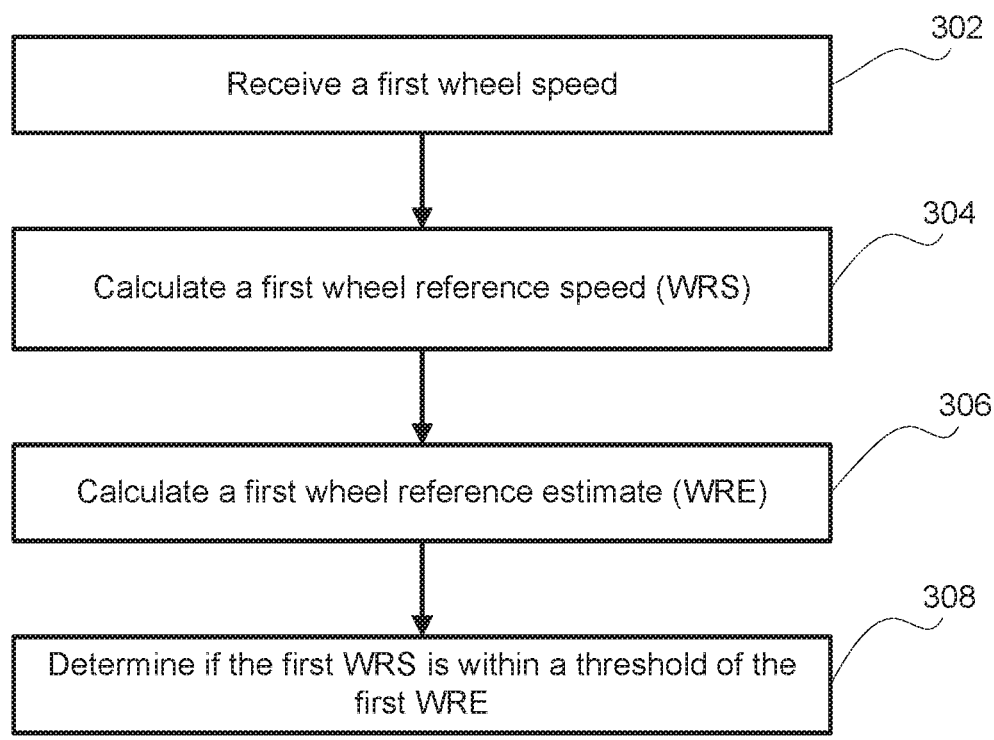
FIG. 3 illustrates a method for controlling brakes using the system of FIG. 1, in accordance with various embodiments.

With reference to FIG. 3, a method 300 for controlling brakes using brake control system 100 is shown, in accordance with various embodiments. Method 300 may be similar to or the same as the process depicted by flow diagram 200 and flow diagram 201, but presented in a linear manner. Method 300 may include receiving a first wheel speed (step 302). Method 300 may include calculating a first wheel reference speed (WRS) (step 304). Method 300 may include calculating a first wheel reference estimate (WRE) (step 306). Method 300 may include determining if the first WRS is within a threshold of the first WRE (step 308).

With combined reference to FIG. 1, FIG. 2A, FIG. 2B, and FIG. 3, step 302 may include receiving a first wheel speed (i.e., WS1). The first wheel speed may be received by ASK 112. Step 304 may include calculating, by ASK 112, WRS 148. Step 306 may include calculating, by ASK 112, a first wheel reference estimate (i.e., WRE 230). Step 308 may include determining if WRS 148 is within a threshold of WRE 230.

Figure 4A:
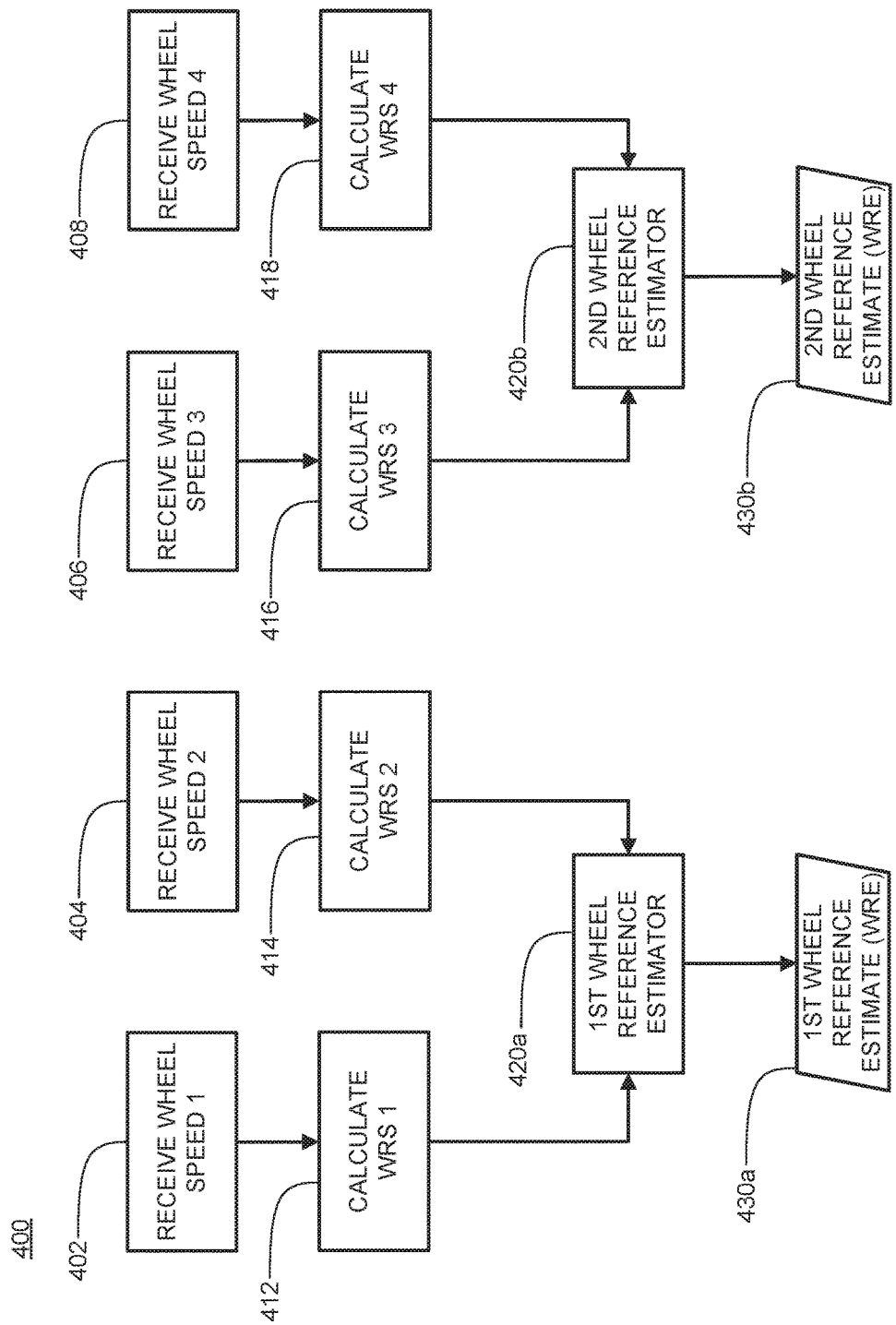
FIG. 4A illustrates a flow diagram for calculating a wheel reference estimate using the system of FIG. 1, in accordance with various embodiments.

With reference to FIG. 4A, a flow diagram 400 is shown for calculating a wheel reference estimate (i.e., first WRE 430a and second WRE 430b) using system 100 (see FIG. 1), in accordance with various embodiments. Flow diagram 400 illustrates a first wheel reference estimator 420a and a second wheel reference estimator 420b. With combined reference to FIG. 1, FIG. 2A and FIG. 4A, wheel reference estimators 420a and 420b may be similar to wheel reference estimator 220. First wheel reference estimator 420a may be for estimating wheel reference speeds corresponding to a first landing gear (i.e., a left main landing gear). Second wheel reference estimator 420b may be for estimating wheel reference speeds corresponding to a second landing gear (i.e., a right main landing gear). In this regard, first WRE 430a may correspond to a first landing gear and second WRE 430b may correspond to a second landing gear. In this regard, wheel speeds corresponding to a first landing gear may be aggregated separate from other wheel speeds corresponding to a second landing gear. Block 402, block 404, block 406, block 408, block 412, block 414, block 416, and block 418 may be similar to block 202, block 204, block 206, block 208, block 212, block 214, block 216, and block 218, respectively.

Figure 4B:
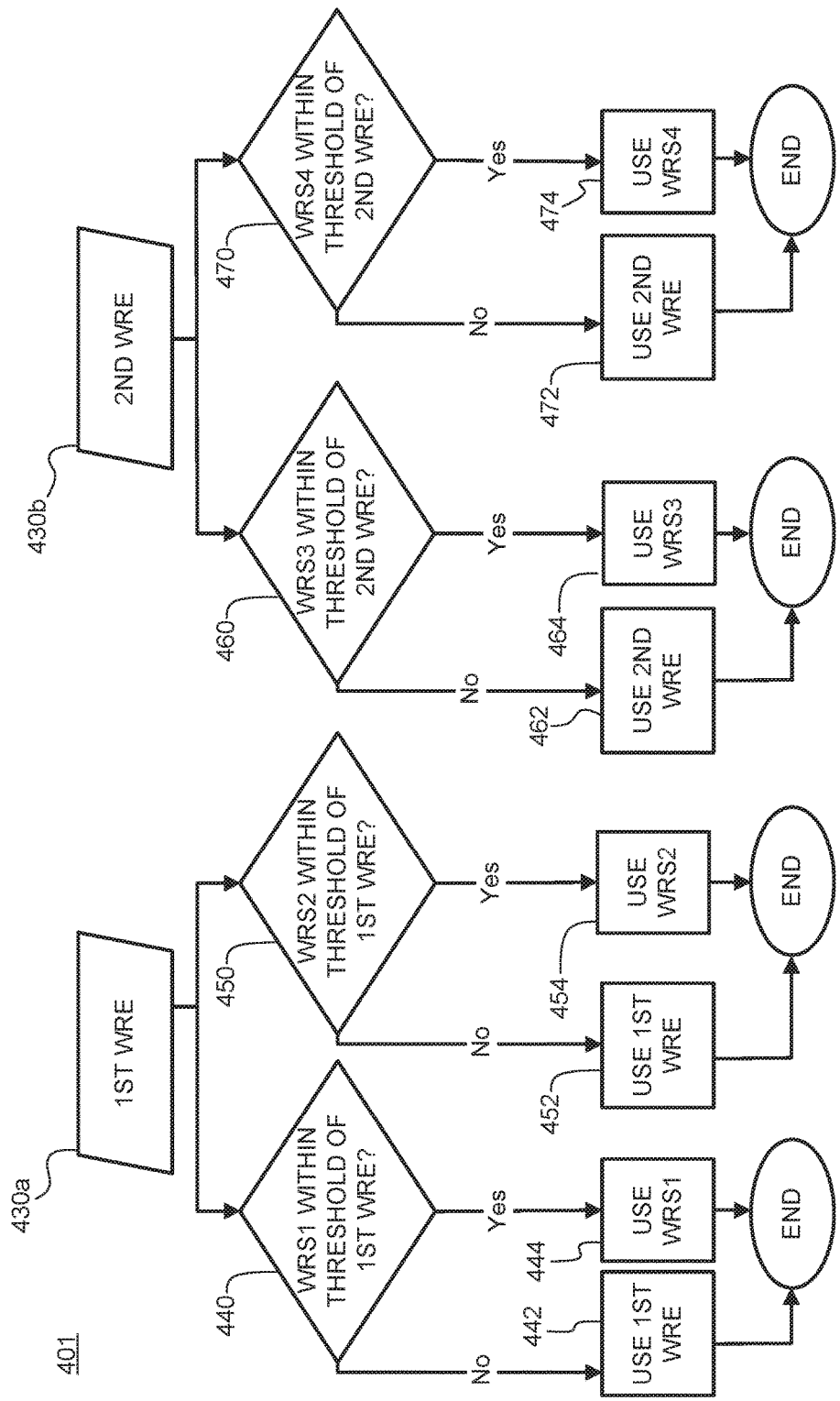
FIG. 4B illustrates a flow diagram for detecting a faulty wheel reference speed using the system of FIG. 1, in accordance with various embodiments.

With reference to FIG. 4B, a continuation of the flow diagram 400 of FIG. 4A is illustrated as flow diagram 401 for detecting a fault) wheel reference speed 148 using system 100 (see FIG. 1), in accordance with various embodiments. With combined reference to FIG. 1, FIG. 2B, and FIG. 4B, block 440, block 450, block 460, block 470, block 442, block 444, block 452, block 454, block 462, block 464, block 472, and block 474 may be similar to block 240, block 250, block 260, block 270, block 242, block 244, block 252, block 254, block 262, block 264, block 272, and block 274, respectively. ASK 112 may calculate ASK desired pressure value 122 using WRS1 in response to WRS1 being within the threshold value of first WRE 430a (Block 444). ASK 112 may calculate ASK desired pressure value 122 using first WRE 430a in response to WRS1 being outside the threshold value of first WRE 430a (Block 442). ASK 112 may calculate ASK desired pressure value 122 using WRS3 in response to WRS3 being within the threshold value of second WRE 430b (Block 464). ASK 112 may calculate ASK desired pressure value 122 using second WRE 430b in response to WRS3 being outside the threshold value of second WRE 430b (Block 462). First WRE 430a and second WRE 430b may be similar to WRE 230.

Figure 5:
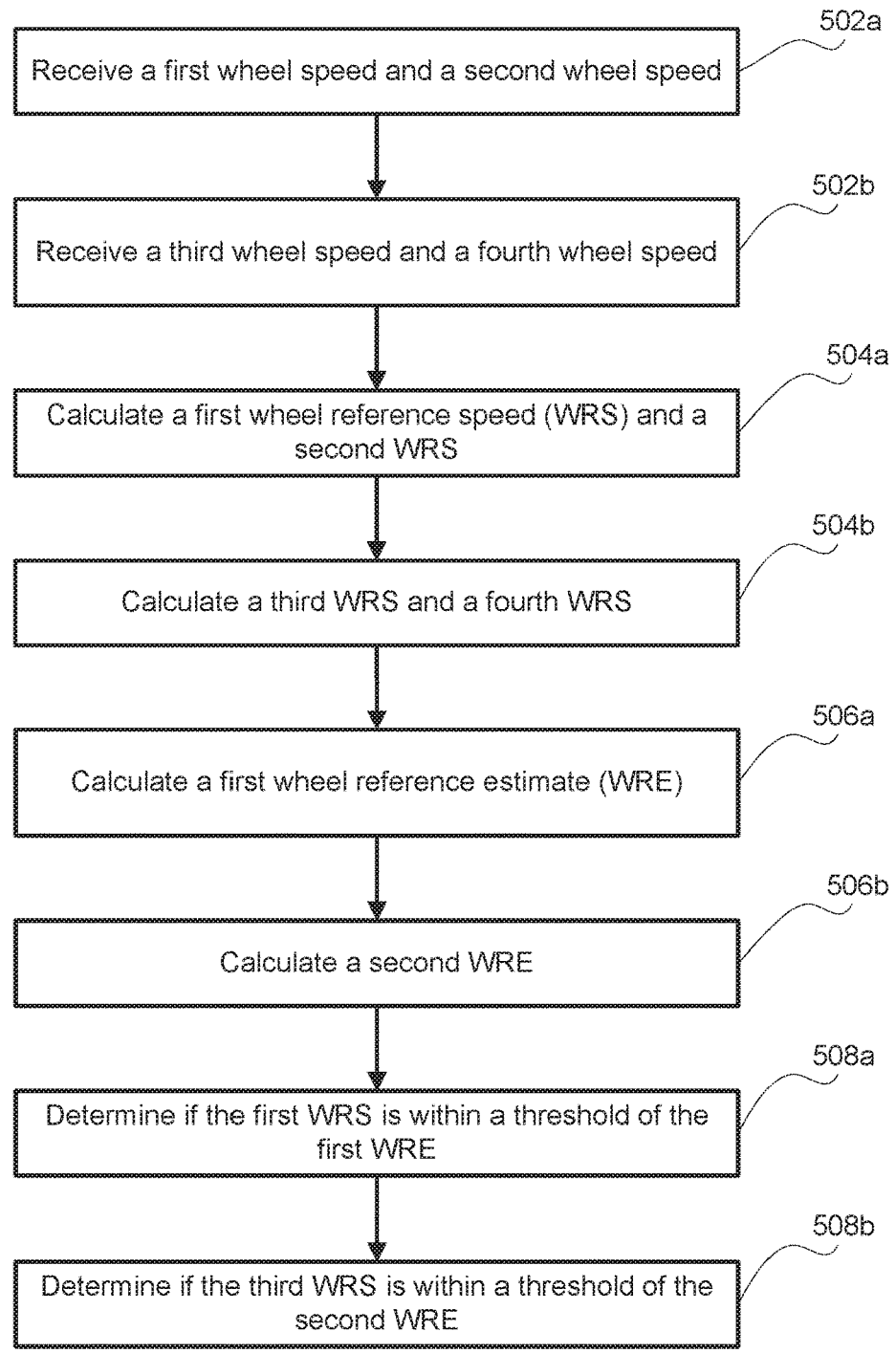
FIG. 5 illustrates a method for controlling brakes using the system of FIG. 1, in accordance with various embodiments.

With reference to FIG. 5, a method 500 for controlling brakes using brake control system 100 is shown, in accordance with various embodiments. Method 500 may be similar to or the same as the process depicted by flow diagram 400 and flow diagram 401, but presented in a linear manner. Method 500 may include receiving a first wheel speed and a second wheel speed (step 502a). Method 500 may include receiving a third wheel speed and a fourth wheel speed (step 502b). Method 500 may include calculating a first wheel reference speed (WRS) and a second WRS (step 504a). Method 500 may include calculating a third WRS and a fourth WRS (step 504b). Method 500 may include calculating a first wheel reference estimate (WRE) (step 506a). Method 500 may include calculating a second WRE (step 506b). Method 500 may include determining if the first WRS is within a threshold of the first WRE (step 508a). Method 500 may include determining if the third WRS is within a threshold of the second WRE (step 508b).

With combined reference to FIG. 1, FIG. 4A, FIG. 4B, and FIG. 5, step 502a may include receiving a first wheel speed and a second wheel speed (i.e., WS1 and WS2). Step 502b may include receiving a third wheel speed and a fourth wheel speed (i.e., WS3 and WS4). WS1, WS2, WS3, and WS4 may be received by ASK 112. Step 504a may include calculating, by ASK 112, a first wheel reference speed (WRS) and a second WRS (i.e., WRS1 and WRS2). Step 504b may include calculating, by ASK 112, a third WRS and a fourth WRS (i.e., WRS3 and WRS4). Step 506a may include calculating, by ASK 112, a first wheel reference estimate (WRE) (i.e., WRE 430a). Step 506b may include calculating, by ASK 112, a second WRE (i.e., WRE 430b). Step 508a may include determining if WRS1 is within a threshold of first WRE 430a. Step 508b may include determining if WRS3 is within a threshold of second WRE 430b.

In this regard, the braking of tires corresponding to different landing gears may be controlled separately. Separate brake control, as provided in FIG. 4A-FIG. 5, may be particularly useful during taxiing, turning, and/or when braking pressure between different landing gears is unequal. In various embodiments, system 100 may use method 500 in response to a pressure command (i.e., pressure command 124) being sent to a brake 106 corresponding to a first landing gear having a greater value than a pressure command (i.e., pressure command 124) being sent to a brake 106 corresponding to a second landing gear.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment. C alone may be present in an embodiment, or that any combination of the elements A, B and C may be present in a single embodiment; for example, A and B, A and C, B and C. or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes, comprising:
   receiving, by an antiskid controller (ASK), a first wheel speed;
   calculating, by the ASK, a first wheel reference speed (WRS), the first WRS comprising a value corresponding to the first wheel speed when no brakes are applied;
   calculating, by the ASK, a first wheel reference estimate (WRE), the first WRE being an average of the first WRS; and
   determining, by the ASK, if the first WRS is within a threshold value of the first WRE.

2. The method of claim 1, further comprising:
   calculating, by the ASK, an ASK desired pressure, wherein, in response to the first WRS being within the threshold value of the first WRE, the ASK desired pressure is calculated using the first WRS.

3. The method of claim 1, further comprising:
   calculating, by the ASK, an ASK desired pressure, wherein, in response to the first WRS being outside the threshold value of the first WRE, the ASK desired pressure is calculated using the first WRE.

4. The method of claim 1, further comprising:
   receiving, by the ASK, a second wheel speed; and
   calculating, by the ASK, a second WRS, wherein the first WRE is calculated using the first WRS and the second WRS.

5. The method of claim 4, further comprising:
   receiving, by the ASK, a third wheel speed;
   receiving, by the ASK, a fourth wheel speed;
   calculating, by the ASK, a third WRS;
   calculating, by the ASK, a fourth WRS; and
   calculating, by the ASK, a second WRE, wherein the second WRE is calculated using the third WRS and the fourth WRS, the first WRS and the second WRS corresponding to a first set of wheels being located on a first landing gear and the third WRS and the fourth WRS corresponding to a second set of wheels being located on a second landing gear.

6. The method of claim 5, wherein the second WRE is calculated by calculating the arithmetic mean of at least the third WRS and the fourth WRS.

7. The method of claim 5, further comprising:
   determining, by the ASK, if at least one of the third WRS and the fourth WRS is within a threshold value of the second WRE.

8. A brake control system, comprising:
   an antiskid control (ASK) configured to:
      receive a first wheel speed value to calculate a first wheel reference speed (WRS) and a second wheel speed value to calculate a second WRS, the first WRS comprising a value corresponding to the first wheel speed value when no brakes are applied;
      calculate a wheel reference estimate (WRE) using the first WRS and the second WRS, the first WRE being an average of at least the first WRS and the second WRS; and
      determine if at least one of the first WRS and the second WRS is within a threshold value of the WRE.

9. The brake control system of claim 8, wherein, in response to the first WRS being within the threshold value of the WRE, the ASK uses the first WRS to calculate a desired pressure.

10. The brake control system of claim 8, wherein, in response to the first WRS being outside the threshold value of the WRE, the ASK uses the WRE to calculate a desired pressure.

11. The brake control system of claim 8, wherein the WRE comprises an average value of at least the first WRS and the second WRS.

12. The brake control system of claim 8, wherein the threshold value comprises between 80% and 120%.

13. The brake control system of claim 8, wherein the first WRS is related to the first wheel speed value by a wheel slip value.

14. A brake control system, comprising:
   a processor;
   a tangible, non-transitory memory configured to communicate with the processor, the tangible, non-transitory memory having instructions stored thereon that, in response to execution by the processor, cause an antiskid control (ASK) to perform operations comprising:
   receiving a first wheel speed;
   calculating a first wheel reference speed (WRS), the first WRS comprising a value corresponding to the first wheel speed when no brakes are applied;
   calculating a first wheel reference estimate (WRE), the first WRE being an average of the first WRS; and
   determining if the first WRS is within a threshold value of the first WRE.

15. The brake control system of claim 14, wherein the operations further comprise:
   calculating an ASK desired pressure, wherein, in response to the first WRS being within the threshold value of the first WRE, the ASK desired pressure is calculated using the first WRS.

16. The brake control system of claim 14, wherein the operations further comprise:
   calculating an ASK desired pressure, wherein, in response to the first WRS being outside the threshold value of the first WRE, the ASK desired pressure is calculated using the first WRE.

17. The brake control system of claim 14, wherein the operations further comprise:
   receiving a second wheel speed; and
   calculating a second WRS, wherein the first WRE is calculated using the first WRS and the second WRS.

18. The brake control system of claim 17, wherein the operations further comprise:
   receiving a third wheel speed;
   receiving a fourth wheel speed;
   calculating a third WRS;
   calculating a fourth WRS; and
   calculating a second WRE, wherein the second WRE is calculated using the third WRS and the fourth WRS, the first WRS and the second WRS corresponding to a first set of wheels being located on a first landing gear and the third WRS and the fourth WRS corresponding to a second set of wheels being located on a second landing gear.

19. The brake control system of claim 18, wherein the second WRE is calculated by calculating the arithmetic mean of at least the third WRS and the fourth WRS.

20. The brake control system of claim 19, wherein the operations further comprise:
   determining if at least one of the third WRS and the fourth WRS is within a threshold value of the second WRE.

\* \* \* \* \*